(12) United States Patent
Kozlowski

(10) Patent No.: US 10,786,796 B2
(45) Date of Patent: Sep. 29, 2020

(54) VIBRATION ISOLATION BLENDER SYSTEM

(71) Applicant: Vita-Mix Management Corporation, Olmsted Township, OH (US)

(72) Inventor: Eugene J. Kozlowski, Medina, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 230 days.

(21) Appl. No.: 15/800,250

(22) Filed: Nov. 1, 2017

(65) Prior Publication Data

US 2018/0117552 A1    May 3, 2018

Related U.S. Application Data

(60) Provisional application No. 62/415,536, filed on Nov. 1, 2016.

(51) Int. Cl.
*B01F 15/00* (2006.01)
*B01F 7/00* (2006.01)
*A47J 43/07* (2006.01)
*A47J 43/046* (2006.01)

(52) U.S. Cl.
CPC ....... *B01F 15/00538* (2013.01); *A47J 43/046* (2013.01); *A47J 43/0777* (2013.01); *B01F 7/00291* (2013.01); *B01F 15/00207* (2013.01); *B01F 15/00753* (2013.01); *B01F 2215/0014* (2013.01); *B01F 2215/0026* (2013.01)

(58) Field of Classification Search
CPC ............... A47J 43/046; A47J 43/0777; B01F 15/00538; B01F 7/00291; B01F 15/00207; B01F 15/00753; B01F 2215/0014; B01F 2215/0026
See application file for complete search history.

(56) References Cited

U.S. PATENT DOCUMENTS

| | | | |
|---|---|---|---|
| 3,901,484 A | 8/1975 | Emster |
| 4,277,181 A | 7/1981 | Stahly |
| 6,595,113 B1 | 7/2003 | Chang |
| 7,320,542 B2 | 1/2008 | Tai |
| 2005/0099884 A1 | 5/2005 | Lee |
| 2006/0007778 A1 | 1/2006 | Tai |
| 2010/0208548 A1 | 8/2010 | Hemelgam |
| 2013/0264405 A1 | 10/2013 | Audette |
| 2014/0284120 A1 | 9/2014 | Howell |

(Continued)

FOREIGN PATENT DOCUMENTS

| | | |
|---|---|---|
| WO | WO2016/196271 | 12/2016 |
| WO | WO2018/034979 | 2/2018 |

OTHER PUBLICATIONS

International Searching Authority, US Office, International Search Report and the Written Opinion, PCT/US2017/46487, dated Nov. 2, 2017.

*Primary Examiner* — Anshu Bhatia
(74) *Attorney, Agent, or Firm* — McDonald Hopkins LLC

(57) ABSTRACT

A blender base is generally described. The blender base includes a base frame. An outer shell may be connected to the base frame. A motor housing is supported by the base frame and positioned inside the outer shell. The motor housing is isolated from direct connection with the outer shell to reduce the transfer of noise and vibration from the motor to the outer shell.

17 Claims, 4 Drawing Sheets

(56) References Cited

U.S. PATENT DOCUMENTS

2015/0351589 A1* 12/2015 Boozer ............ B01F 15/00772
                                                        366/205
2016/0143483 A1   5/2016 Boozer
2016/0348697 A1  12/2016 Gilliland

* cited by examiner

VIBRATION ISOLATION BLENDER SYSTEM

CROSS-REFERENCE TO RELATED APPLICATION

This application claims priority to U.S. Provisional Patent Application No. 62/415,536 entitled "VIBRATION ISOLATION BLENDER SYSTEM," filed on Nov. 1, 2016, which is incorporated herein by reference in its entirety.

BACKGROUND

Loud noise in both household and commercial blenders has been an issue. Blenders may be designed for home use or for commercial use, and typically perform a mixing function for a drink or other food. When utilized in businesses, such as restaurants or coffee shops, the blender is often positioned adjacent to a serving or dining area so that the food or drinks may be prepared as ordered. When so placed, the sound emitted by the blender can disturb or distract customers as it processes or mixes a drink.

The motor is a direct source of noise when in operation, and also is an indirect source of noise due to the vibration it creates within the base. The vibrations created by the operating motor cause the base itself, and other components within the base, to vibrate, thereby generating additional noise. Further, noise and vibration from the motor may be translated to other components of the base, such as the shell or enclosure. Vibrations translated from the motor to the base shell cause the shell to act as a sound amplifier.

Furthermore, the cooling air flowing through the blender base can amplify the loud motor sound. Cooling air is typically provided to the motor within the base to prevent overheating. This cooling air may be drawn in through an air inlet and forced out of the base through an air exhaust. The airflow exiting the base of the food processor carries the loud noise created during operation of the blender to the exterior of the base, effectively amplifying the sound.

Various methods have been used to reduce the sound created by a blender. One such method includes providing a sound enclosure around the container of the food processor to contain the noise created by the mixing being performed. Also, previous attempts have been made to provide a baffle within the base to suppress the noise carried by the cooling airflow.

Blender systems that use these methods may still produce large amounts of noise that may be unacceptable. It, therefore, is desirable to provide a blender system that may reduce noise. It may also be desirable to provide a more efficient blender system.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Described herein is a blender base that comprises a base frame, a housing comprising side walls, wherein the housing is operatively attached to the base frame a motor, a motor housing operatively housing the motor, a motor plate attached to the motor housing and at least one gasket disposed between the motor plate and the housing. The motor housing is isolated from direct contact with the housing via the at least one gasket. The blender base includes fan housing disposed generally below the motor housing and at least one fan gasket disposed between the fan housing and the motor housing. The motor housing is isolated from directly contacting the housing and the fan housing. In examples, the fan housing is monolithically formed with the base frame. In another aspect, motor plate is overmolded with the at least one gasket. The motor plate is directly attached to the motor housing. It is noted that the housing may comprise an inner shell and an outer shell.

Also described is a blender base comprising a motor housing that houses a motor, a base frame, and a gasket disposed between the base frame and the motor housing, wherein the motor housing does not directly contact the base frame. The motor plate operatively attached to the motor housing. The blender base includes a housing operatively enclosing the motor and operatively attached to the base frame. The motor plate is disposed generally above side walls of the housing, and wherein the motor is suspended from the motor plate within the housing. In examples, a portion of the base frame contacts the gasket and a portion of the motor housing contacts the gasket. The portion of the base frame, the gasket, and the portion of the motor housing comprise a flexible joint. The gasket comprises an elastomeric material.

In an example, a blender device comprises a base frame side walls extending upwards from the base frame, wherein the base frame and the side walls define a cavity, a motor plate disposed above the side walls and operatively attached to a top side of the motor housing, a first gasket disposed between the motor plate and the side walls, and a second gasket disposed between the base frame and a bottom side of the motor housing, wherein the motor plate is isolated from direct contact with the side walls, and the motor housing is isolated from direct contact with the base frame. The blender device includes a pedestal disposed proximal to the motor plate. The motor plate is directly connected to the motor housing. The blender device includes third gasket disposed between the base frame and the side walls.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Figure 1:
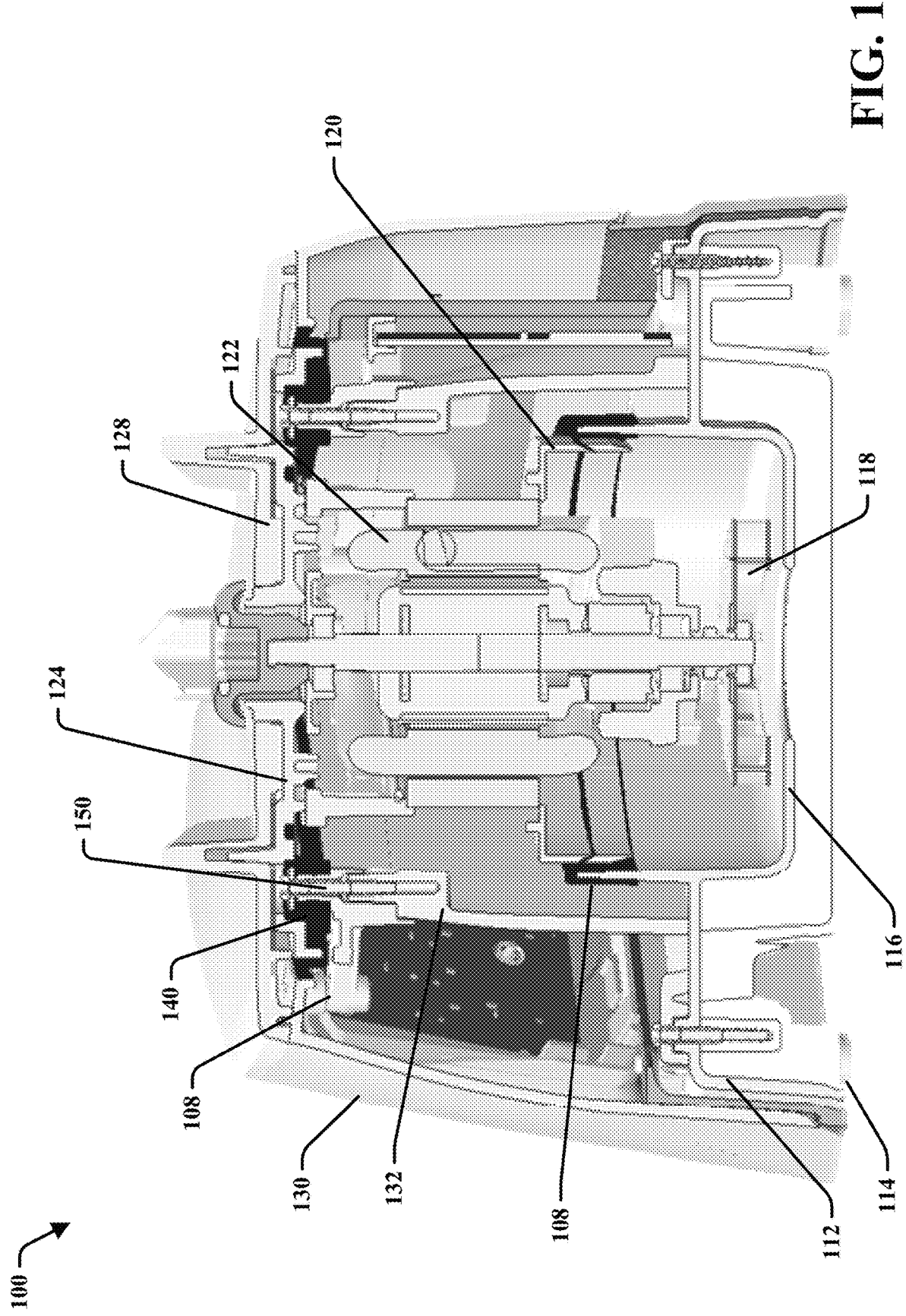
FIG. 1 illustrates a cross-sectional view of a blender base in accordance with disclosed aspects.

Reference will now be made in detail to exemplary embodiments of the present invention, examples of which are illustrated in the accompanying drawings. It is to be understood that other embodiments may be utilized, and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, and the like. As such, references to a blender, blending system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner. Foodstuff may be added to the blending container. Furthermore, while blending of "ingredients," "contents" or "foodstuff" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In some traditional blending devices, rotation of blades in a container and operation of a motor may produce a large amount of noise that may be unpleasant for a user. For instance, a user may operate the motor to drive blades. This may cause vibrations that may be transferred from the motor to other components of a blender base, such as a shell/housing, or the like. The vibration may result in noise. This noise may increase at high speeds, during certain blending programs, or blending of certain ingredients. This noise may be undesirable for consumer applications and in business applications. In an example, a commercial kitchen may employ one or more blenders to produce frozen drinks. These commercial kitchens may need to reduce noise such that customers may place orders and are comfortable at the commercial kitchen.

In embodiments, a blender assembly may include a blender base comprising a housing that houses a motor. The motor may include a drive shaft that operatively drives an attachable blade assembly. The motor may be coupled with a rigid base plate. The base plate may be isolated from contact with the housing. The housing may include a base shell and a base body. In an aspect, the base plate may be isolated from the housing by one or more elastomeric members or gaskets (e.g., a first/baseplate gasket). For instance, a rubber gasket may be disposed between the base plate and connection points with the base shell and body. The gasket may absorb vibrations, provide a flexible joint, and/or may reduce noise produced by operation of the blender. The blender assembly may include other or different elastomeric members. For instance, a fan/second gasket may isolate a motor housing from a base frame. The second gasket may comprise an annular gasket disposed between the fan housing and the motor housing such that the fan housing contacts one side of the second gasket and the motor housing contacts the other side of the gasket. In an aspect, the second gasket may be compressed between the motor housing and the fan housing. It is further noted that the fan housing may be isolated from the housing/shell via one or more other gaskets. The described blender assembly may provide other or different advantages that may be apparent throughout.

Figure 4:
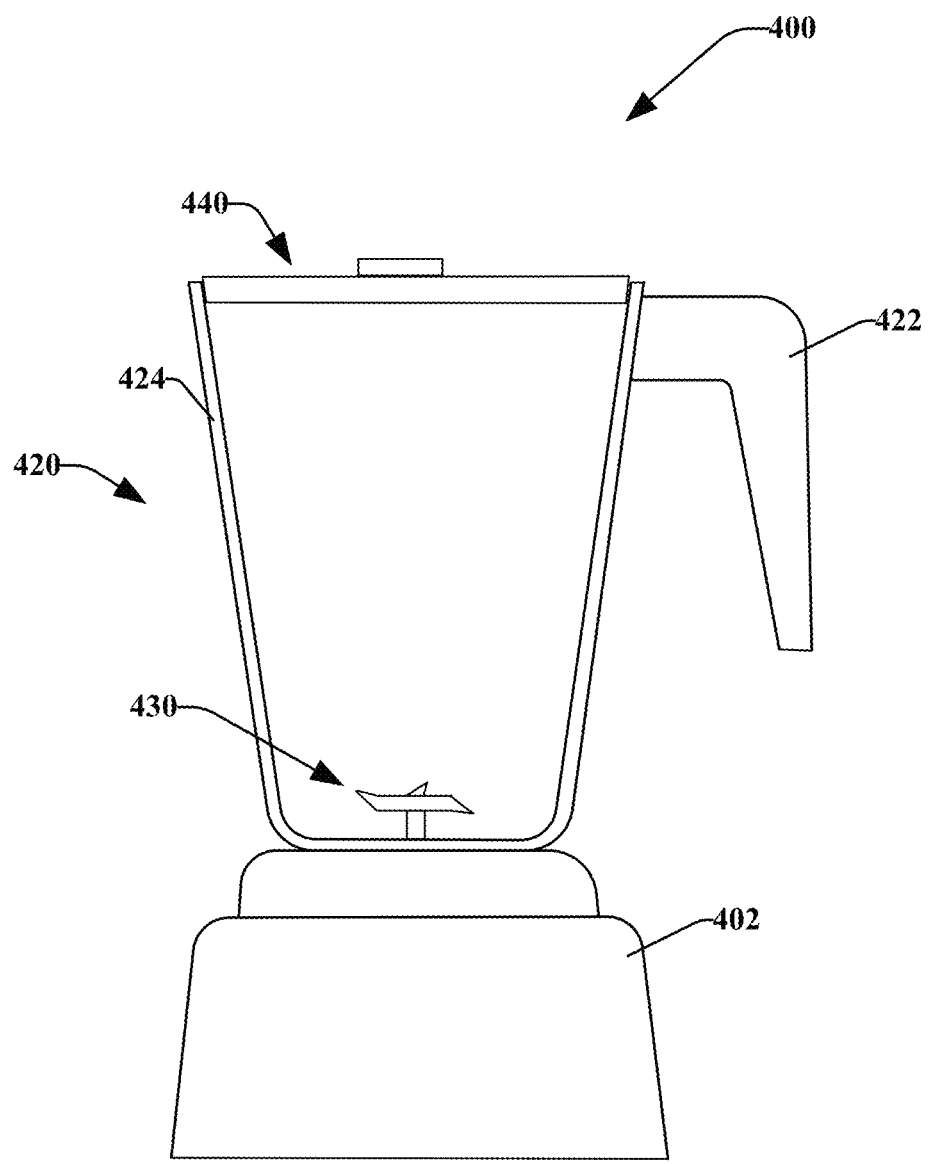
FIG. 4 illustrates a blending system including a blender base and a container in accordance with disclosed aspects.

Turning to FIG. 1, there is a blender base 100 that may be utilized with a blender container (as shown in FIG. 4) and blade assembly (as shown in FIG. 4). The blender base 100 is generally configured to facilitate rotation of the blade in the blender container. It is noted that embodiments may include different or additional components than shown in the drawings. Moreover, aspects of this disclosure may be utilized with other apparatuses. While various components may be referred to as separate or distinct components, it is noted that such components may be monolithically formed. For example, a housing or shell may comprise a one piece construction or may comprise p pieces operatively attached together. Likewise, components may be comprised of various subcomponents that may be monolithically formed with each other.

As shown, blender base 100 may include a base frame 112. The base frame 112 may be any appropriate shape, size or configuration, such as generally rectangular or irregular in shape. In another aspect, the base frame 112 may comprise an appropriate material, such as a plastic, metal, ceramic, or the like. Base frame 112 may include various formations or components, such as feet 114, vents, baffles, or the like. The feet 114 may be any appropriate size or shape and may be located at any appropriate position about the base frame 112, such as disposed about the bottom surface of the base frame 112. The feet 114 may engage a surface that supports the blender base 100 to stabilize and level the base frame 112, such as a counter top. The feet 112 may include bumpers (e.g., rubber pads), or the like. In at least one embodiment, base frame 112 may include a fan chamber 116. The fan chamber 116 operatively houses a fan 118. The fan 118 may draw air through the blender base 100 to cool the blender base 100 and components thereof.

In an aspect, the base frame 112 may support various components of the blender base 100. For example, the base frame 112 may support a motor housing 120. The motor housing 120 may house a motor 122. The motor 122 may be disposed at any appropriate position, such as generally above the base frame 112, in a general center of the blender base 100, or the like. The motor housing 120 may comprise a plurality of walls of an appropriate size or shape, such as generally rectangular.

According to embodiments, the motor housing 120 may be rigidly attached (e.g., removably or irremovably) to a motor plate 124. For instance, the motor housing 120 may be attached to the motor plate 124 via welding, fastener(s), or the like. It is noted that the motor housing 120 and the motor plate 124 may be monolithically formed and/or separate parts that are attached together. The motor plate 124 may comprise a rigid material such as a rigid plastic, metal, or the like.

Motor plate 124 may support a pedestal 128 that operatively receives a blender container. The pedestal 128 may comprise an appropriate material, such as an elastomeric material that may absorb vibrations between the container and the blender base 100. It is noted that the pedestal 128 may comprise one or more protrusions or other formations that operatively attach to a container.

In at least one embodiment, blender base 100 may include a housing comprising an outer body or shell 130 and an inner or main body 132. The shell 130 may separate the operative components of the blender base 100 from an external environment. The shell 130 may comprise a desired shape, such as a generally rectangular shape, or the like. Main body 132 may house the motor 122 and motor housing 120. The main body 132 may be comprised of metal, plastic, or the like. It is noted that the main body 132 may be monolithically formed with the shell 130. In at least one embodiment, the main body 132 is separately formed and operatively attached to the shell 130. As such, the main body 132 and shell 130 may be referred to as the blender housing or housing.

Motor plate 124 operatively couples with the shell 130 and main body 132. In an aspect, the connection between the motor plate 124, and the shell 130 may be isolated by an elastomeric member or gasket 140. It is noted that the gasket 140 may additionally or alternatively isolate the motor plate 124 from the main body 132. For instance, the main body 132 and shell 130 may be attached or formed together. The gasket 140 may be positioned such that it is disposed between connection points of motor plate 124 and at least one of the shell 130 or the main body 132 when the motor plate 124 is assembled with the housing. The gasket 140 may absorb vibrations produced via operation of motor 122 and passed through the motor plate 124, such that less, dampened, or no vibrations are passed to the housing (e.g., at least one of the shell 130 or the main body 132).

In at least one embodiment, the main body 132 and the shell 130 may connect to each other. The motor plate 124 may be attached to one or more of the connected main body 132 and shell 130. As such, motor plate 124 may be directly connected to one but not the other of main body 132 and shell 130. Aspects of the connections will be described in more detail herein.

Gasket 140 may comprise an elastomeric material, such as a foam, rubber, plastic, gel, fiber materials (e.g., fabric, wood, etc.), or the like. In another aspect, the elastomeric material may be generally compressed between connection points to stiffen the elastomeric material while maintaining vibration absorbing properties. As described here as well as elsewhere, the gasket 140 may be disposed between the various components. The gasket 140 may be positioned during assembly and/or may be attached (e.g., removably or irremovably) to one or more component. For example, the gasket may be overmolded onto the motor plate 124. Overmolding the motor plate 124 with the gasket 140 may reduce time needed to position the gasket during assembly of the blender base 100. In another aspect, overmolding may reduce or prevent the gasket 140 from being moved out of a desired position. It is noted that various other methods of attaching gasket 140 to the motor plate 124 or other components may be utilized. For instance, the gasket 140 may be attached to the motor plate 124 by way of an adhesive, chemical deposition, a magnetic connection, fasteners, cleats, friction fit, or any other desired method.

Figure 2:
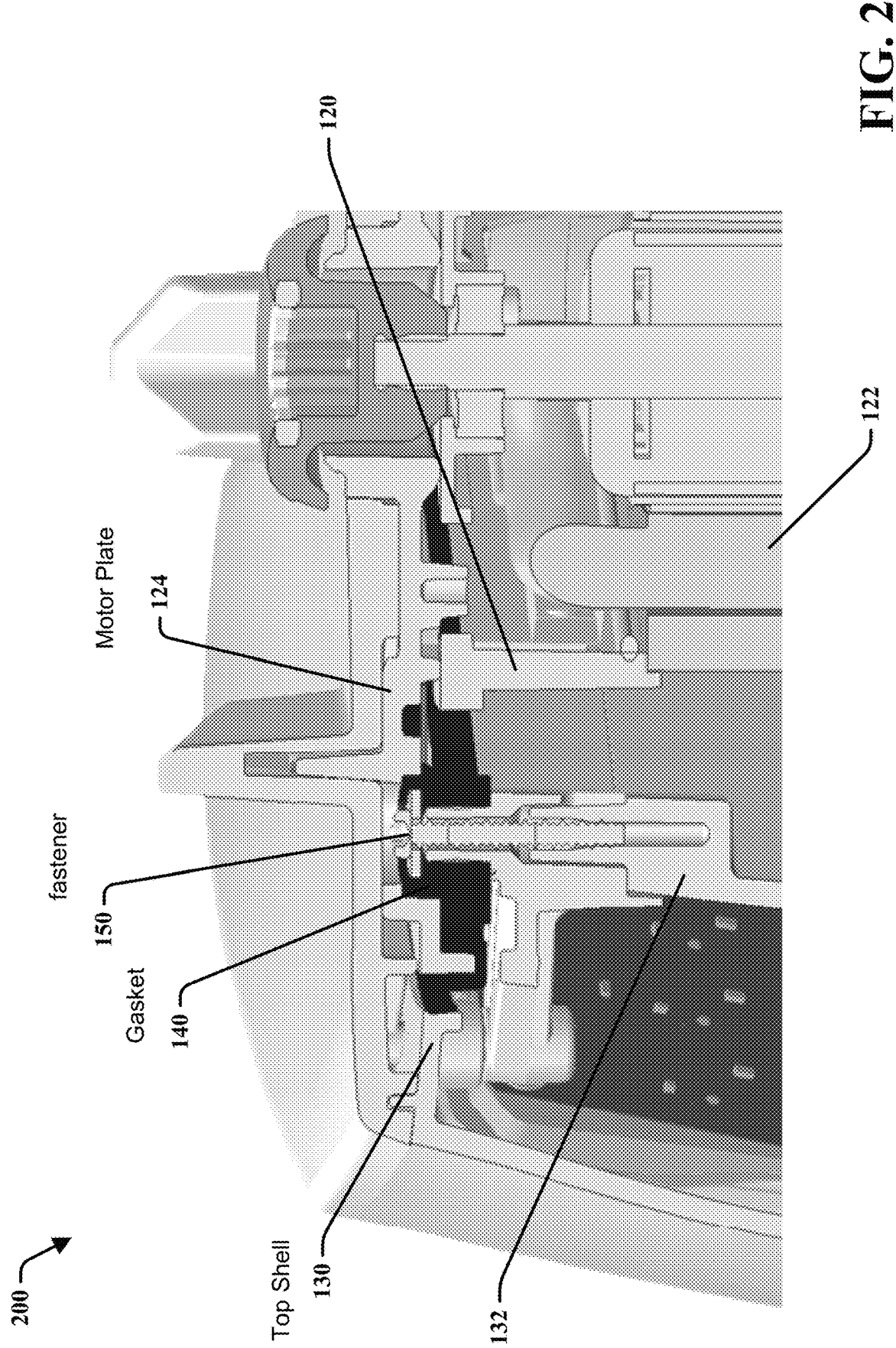
FIG. 2 illustrates an enlarged, cross-sectional view of a blender base in accordance with disclosed aspects.

Turning to FIG. 2, with reference to FIG. 1, there is an enlarged view 200 of the connection between motor plate 124, top shell 130, and main body 132. Motor housing 120 may be directly coupled with motor plate 124. For example, motor plate 124 and motor housing 120 may be fastened together with a fastener 150.

In embodiments, the gasket 140 may be compressed between the motor plate 124 and top shell 130 and/or main body 132. Compression of the gasket 140 may stiffen the gasket 140 between the motor plate 124 and the other components of the blender base 100. While gasket 140 may be stiffened, it may retain elastomeric properties, such as vibration isolation.

The gasket 140 may comprise a single component and/or may comprise multiple components. For instance, the gasket 140 may comprise a monolithically formed gasket, one or more layers of gaskets, separate pieces, or the like. In embodiments, the gasket 140 may be disposed such that the top plate 124 does not directly contact the main body 132 and/or top shell 130. In other embodiments, gasket 140 may be disposed such that portions of top plate 124 may contact main body 132 and/or top shell 130, while other portions of top plate 124 do not contact main body 132 and/or top shell 130. For example, gasket 140 may be disposed at areas proximal a fastener 150, while gasket 140 does not isolate motor plate 124 at other areas, or vice versa.

According to various embodiments, motor housing 120 may be isolated from direct contact with other members of the blender base 100. For instance a second or bottom gasket 108 may be disposed between motor housing 120 and base frame 112. The bottom gasket 108 may comprise similar or different materials than gasket 140. Bottom gasket 108, moreover, may be monolithically formed, may comprise one or more separate pieces, or the like.

In an example, base frame 112 may comprise a fan chamber 116. It is noted that the fan chamber 116 may be monolithically formed with the base frame 112 or may be separately formed and attachable to the base frame 112. The fan chamber 116 may house a fan 118 that is driven by motor 122. Fan 118 may provide an airflow to motor 122 during operation. The airflow may cool the motor 122 by dissipating or displacing heat. In an aspect, the bottom gasket 108 may be disposed between the fan chamber 116 and the motor housing 120. The bottom gasket 108 may dampen, absorb, or otherwise isolate vibrations. This may reduce transfer of vibrations to base frame 112 from the motor 122, which may eliminate noise or reduce noise in comparison with blender systems without bottom gasket 108.

Figure 3:
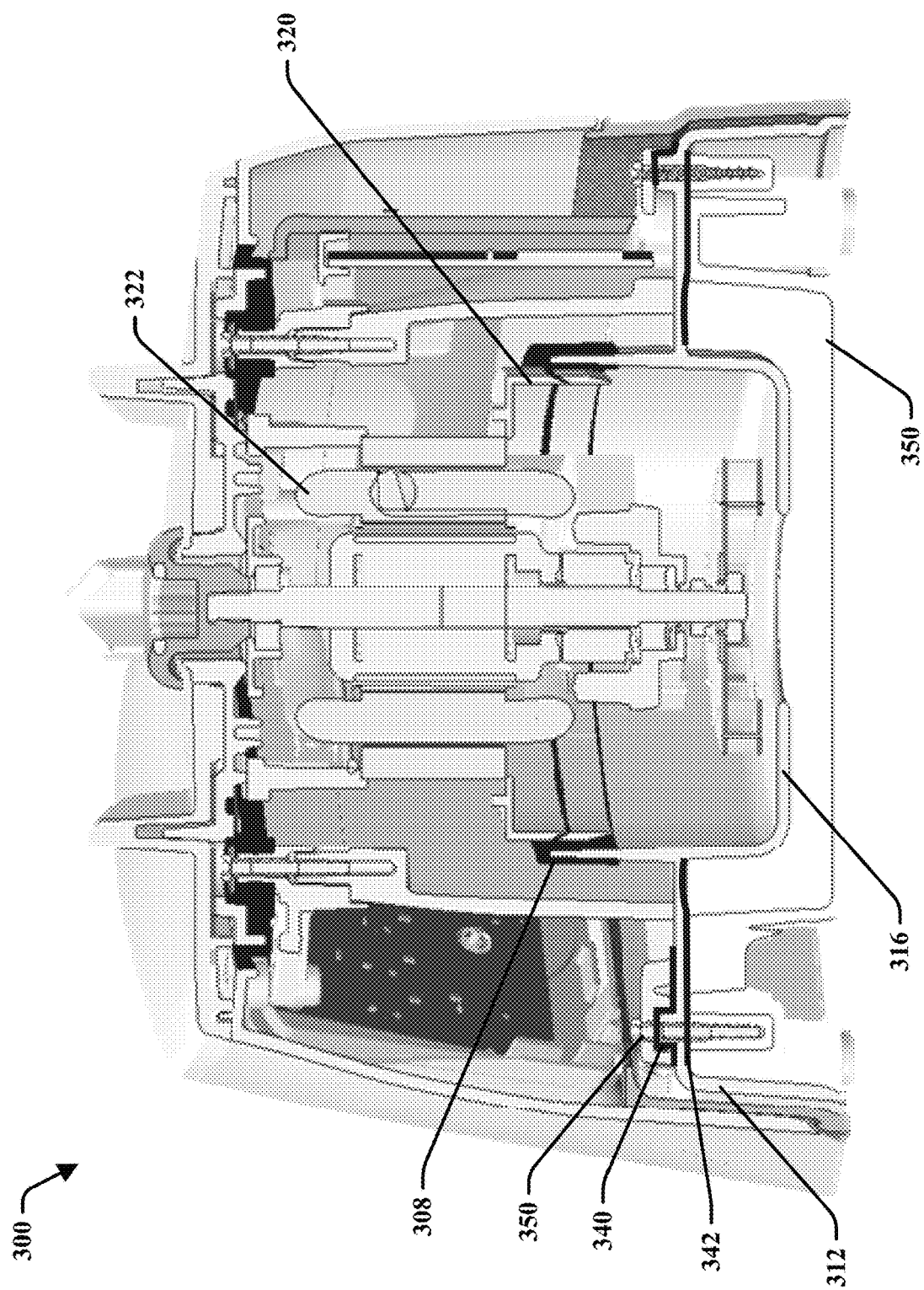
FIG. 3 illustrates a top view of a base frame in accordance with disclosed aspects.

FIG. 3 illustrates another embodiment of a blending system 300. In this embodiment, blending system 300 includes a base 312, a fan chamber 316 housing a fan, a motor housing 320 to house a motor 322, a fan gasket 308 disposed between the fan chamber 316 and motor housing 320, an air intake 350 along the base 312, a base gasket 342 along the lower portion of base 312, and a second bottom gasket 340 along the upper portion of base 312.

It is noted that bottom gasket 108 may be disposed at other locations and/or various embodiments may not include a fan chamber. In one embodiment, the fan chamber 116 may be monolithically formed with a motor housing 120. The bottom gasket 108 may be disposed between the monolithically formed fan chamber 116/motor housing 120 and the base frame 112. In an aspect, bottom gasket 108 generally isolates the motor housing 120 and/or other components from base frame 112, or various other portions of blender base 100. It is further noted that the gasket 108 may be compressed between the motor housing 12 and base 112. Compression of the gasket 108 may stiffen the gasket 108 between the motor housing 12 and base 112, and gasket 108 may retain elastomeric properties, such as vibration isolation.

FIG. 4 illustrates an exemplary blending system 400 in accordance with various disclosed embodiments. System 400 may utilize various disclosed aspects. For instance, system 400 may include vibration isolation components as described with reference to FIGS. 1-3. In another aspect, like named components may comprise similar aspects (e.g., blender base 402 may comprise similar aspects as blender base 100).

System 400 primarily includes a blender base 402, a container 420 operatively attachable to the blender base 402 (which may include vibration isolation components), a blade assembly 430, and a lid 440 that may be operatively attached to the container. The container 420 may include walls 424 and a handle 422. Foodstuff may be added to the container 420 for blending. It is noted that the container 420 may comprise various materials such as plastics, glass, metals, or the like. In another aspect, container 420 may be powered in any appropriate manner.

The blade assembly 430, container 420, and base 402 may removably or irremovably attach. The container 420 may be powered in any appropriate manner, such as disclosed in U.S. patent application Ser. No. 14/213,557, entitled Powered Blending Container, which is hereby incorporated by reference. While shown as a large-format system, system 400 may comprise a single serving style system, where the container is filled, a blender base is attached to the container, and then the container is inverted and placed on a base.

The base 402 includes a motor disposed within a housing. The motor selectively drives the blade assembly 430 (e.g., cutting blades, chopping blades, whipping blades, spiralizing blades, etc.). The blade assembly 430 may agitate, impart heat, or otherwise interact with contents within the container. Operation of the blender system 400 may impart heat into the contents within container 420.

In at least one embodiment, the blending system 400 may identify or detect whether the system 400 is interlocked through mechanical detection (e.g., push rods), user input, image recognition, magnetic detection (e.g., reed switches), electronic detection (e.g., inductive coils, a near field communication (NFC) component), or the like.

System 400 and processes described herein generally relate to blending or food-processing systems that include a food-processing disc comprising one or more inductive coils. In another aspect, one or more of the discs and/or lid may comprise an NFC component that may interact with an NFC component of a blender base. The NFC component of the blender base may receive information regarding the type of the disc and may utilize the blender base may utilize the information to determine a blending process to be utilized by the system.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor.

As used herein, the phrases "blending process," "blending program," and the like are used interchangeably unless context suggests otherwise or warrants a particular distinction among such terms. A blending process may comprise a series or sequence of blender settings and operations to be carried out by the system 400. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

It is further noted that various modifications are within the scope and spirit of this disclosure. For instance, a drive coupler may comprise different components, shapes, or the like. Moreover, drive sockets may or may not be splined. As such, various other mechanisms may be utilized for attaching a blade assembly to a drive coupler. Moreover, while embodiments have been illustrated as comprising a clip, tabs, or the like, a drive coupler may be attached to a drive shaft by various other methods, such as threaded connections, screws, bolts, rivets, other fasteners, magnetic connections, welding, or the like.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blender base comprising:
a base frame;
a housing comprising a main body and a top shell, wherein the housing is operatively attached to the base frame;
a motor;
a motor housing operatively housing the motor, wherein the motor housing is isolated from directly contacting the housing via at least one bottom gasket;
a fan housing disposed generally below the motor housing;
at least one fan gasket disposed between the fan housing and the motor housing; and
a motor plate configured to operatively couple with the main body and top shell of the housing, wherein the motor plate is isolated from the top shell and the main body by at least one second gasket.

2. The blender base of claim 1, wherein the motor housing is isolated from directly contacting the housing and the fan housing.

3. The blender base of claim 1, further wherein the fan housing is monolithically formed with the base frame.

4. The blender base of claim 1, wherein the motor plate is overmolded with the at least one gasket.

5. The blender base of claim 1, wherein the housing comprises an inner shell and an outer shell.

6. The blender base of claim 1, wherein the motor plate is directly attached to the motor housing.

7. A blender base comprising:
a motor housing that houses a motor;
a base frame;
a fan housing disposed generally below the motor housing;
at least one fan gasket disposed between the fan housing and the motor housing; and
a second gasket disposed between the base frame and the motor housing, wherein the motor housing does not directly contact the base frame.

8. The blender base of claim 7, further comprising a motor plate operatively attached to the motor housing.

9. The blender base of claim 8, further comprising a housing operatively enclosing the motor housing and operatively attached to the base frame.

10. The blender base of claim 9, wherein the motor plate is disposed generally above side walls of the housing, and wherein the motor is suspended from the motor plate within the housing.

11. The blender base of claim 7, wherein a portion of the base frame contacts the second gasket and a portion of the motor housing contacts the second gasket.

12. The blender base of claim 11, wherein the portion of the base frame, the second gasket, and the portion of the motor housing comprise a flexible joint.

13. The blender base of claim 7, wherein the fan gasket and second gasket comprise an elastomeric material.

14. A blender device comprising:
a base frame;
side walls extending upwards from the base frame, wherein the base frame and the side walls define a cavity;
a motor plate disposed above the side walls and operatively attached to a top side of a motor housing;
a fan housing disposed generally below the motor housing;
at least one fan gasket disposed between the fan housing and the motor housing;
a first gasket disposed between the motor plate and the side walls; and
a second gasket disposed between the base frame and a bottom side of the motor housing;
wherein the motor plate is isolated from direct contact with the side walls, and the motor housing is isolated from direct contact with the base frame.

15. The blender device of claim 14, further comprising a pedestal disposed proximal to the motor plate.

16. The blender device of claim 14, wherein the motor plate is directly connected to the motor housing.

17. The blender device of claim 14, further comprising a third gasket disposed between the base frame and the side walls.

* * * * *